(12) United States Patent
Betin et al.

(10) Patent No.: US 8,284,480 B2
(45) Date of Patent: Oct. 9, 2012

(54) LASER AMPLIFIED POWER EXTRACTION ENHANCEMENT SYSTEM AND METHOD

(75) Inventors: Alexander A. Betin, Manhattan Beach, CA (US); Vladimir V. Shkunov, Torrance, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/860,615

(22) Filed: Aug. 20, 2010

(65) Prior Publication Data

US 2011/0007384 A1    Jan. 13, 2011

Related U.S. Application Data

(62) Division of application No. 12/148,356, filed on Apr. 18, 2008, now Pat. No. 7,800,819, which is a division of application No. 11/253,994, filed on Oct. 19, 2005, now Pat. No. 7,391,558.

(51) Int. Cl.
*H01S 3/06* (2006.01)

(52) U.S. Cl. ......... 359/347; 359/333; 359/346; 372/106

(58) Field of Classification Search .................. 359/333, 359/346, 347; 372/106
See application file for complete search history.

(56) References Cited

U.S. PATENT DOCUMENTS

| | | | |
|---|---|---|---|
| 4,019,151 A | 4/1977 | Brueckner et al. | |
| 4,493,085 A | 1/1985 | Valley | |
| 4,734,911 A | 3/1988 | Bruesselbach | |
| 4,802,176 A | 1/1989 | O'Meara et al. | |
| 4,944,591 A | 7/1990 | McMichael | |
| 5,038,359 A | 8/1991 | Pepper et al. | |
| 5,042,922 A | 8/1991 | Pepper | |
| 5,166,508 A | 11/1992 | Davis et al. | |
| 5,502,590 A | 3/1996 | Suzuki et al. | |
| 5,872,804 A * | 2/1999 | Kan et al. | 372/93 |
| 6,061,133 A | 5/2000 | Freischlad | |
| 6,178,040 B1 * | 1/2001 | Injeyan et al. | 359/346 |
| 6,256,142 B1 * | 7/2001 | Injeyan et al. | 359/345 |
| 6,268,956 B1 * | 7/2001 | Injeyan et al. | 359/345 |
| 6,700,698 B1 | 3/2004 | Scott | |
| 6,813,082 B2 | 11/2004 | Bruns | |

(Continued)

FOREIGN PATENT DOCUMENTS

WO    2005041423 A    5/2005

(Continued)

OTHER PUBLICATIONS

Fowles, "Introduction to Modern Optics" 2nd ed. Dover Publications, New York (1968), pp. 50-51.*

(Continued)

*Primary Examiner* — Eric Bolda (57) ABSTRACT

A high extraction efficiency laser system. The novel laser system includes a laser amplifier and a laser source adapted to provide a laser beam to the amplifier such that polarization states for incident and reflected light within the amplifier are perpendicular one to another. In an illustrative embodiment, the laser beam is input to the amplifier such that the beam reflects back and forth between the side walls of the amplifier with an angle of incidence of about 45 degrees, and the laser beam is linearly polarized in the plane of incidence. This arrangement reduces interference fringes in the amplifier. In an alternative embodiment, the system includes an aberrator adapted to add time-varying aberrations in the laser beam at a rate exceeding an inversed lifetime of an inverted population in the amplifier to increase spatial homogenization of saturation and extraction patterns in the amplifier.

5 Claims, 3 Drawing Sheets

U.S. PATENT DOCUMENTS

| | | | |
|---|---|---|---|
| 6,865,213 B2* | 3/2005 | Perry et al. | 372/72 |
| 2004/0218254 A1* | 11/2004 | Reeder et al. | 359/333 |
| 2005/0063446 A1 | 3/2005 | Betin et al. | |

FOREIGN PATENT DOCUMENTS

| | | |
|---|---|---|
| WO | 2006041444 A | 4/2006 |

OTHER PUBLICATIONS

Pepper, D. M., "Nonlinear Optical Phase Conjugation," Optical Engineering, vol. 21, No. 2, p. 156 (1985).

Zel'Dovich, B. Y., "Principles of Phase Conjugation", Springer-Verlag, Berlin (1985).

Rockwell, D. A., "A Review of Phase-Conjugate Solid-State Lasers," IEEE J. Quantum Electronics, vol. 24, No. 6, pp. 1124-1140 (1988).

Koechner, W., et a.., "Solid-State Lasers: A Graduate Text (Advanced Texts in Physics)", Springer-Verlag, New York (2003).

Koechner, W., "Solid-State Laser Engineering", Springer-Verlag, New York (1999).

Pasch, R., et al., "Single-frequency ytterbium-doped fiber laser stabilized by spatial hole burning," Optics Letts., vol. 22, No. 1, p. 40 (1997).

Lowdermilk, W., et al., "The Multipass Amplifier: Theory and Numerical Analysis", J. Appl. Phys., vol. 51, No. 5 (1980).

Neubert, et al.: "Measurement of the Wigner Distribution of a Tapered Semiconductor Laser" Lasers and electro-optics Europe, 2003. Cleo/Europe. 2003 Conference on Munich, Germany Jun. 22-27, 2003.

Gurashvili, et al., "Effect of Regular Wavefront Perturbations on the Structural Transformation of Laser Beams" Quantum Electronics, vol. 30, No. 9, pp. 303-305 (Sep. 1, 2000).

* cited by examiner

LASER AMPLIFIED POWER EXTRACTION ENHANCEMENT SYSTEM AND METHOD

REFERENCE TO RELATED APPLICATION

This application is a divisional of U.S. application Ser. No. 12/148,356 filed Apr. 18, 2008 which, in turn, is a divisional of, and claims priority to, U.S. application Ser. No. 11/253,994 filed Oct. 19, 2005 (now U.S. Pat. No. 7,391,558 issued Jun. 24, 2008, each of which is incorporated herein, in its entirety, by reference.

BACKGROUND OF THE INVENTION

1. Field of the Invention

The present invention relates to lasers. More specifically, the present invention relates to systems and methods for increasing extraction efficiency in lasers.

2. Description of the Related Art

Power efficiency is a critical issue for many, weapon-class solid-state high energy laser (HEL) systems, specifically for those integrated into mobile platforms. Power efficiency determines, in the long run, system applicability to mobile platform and battlefield conditions where power sources and waste energy management subsystem resources are limited. Diode-pumped solid-state laser systems are preferred for many applications due to the characteristic efficiency thereof. Proper choice of active medium and doping concentration, of pumping diodes and pumping geometry, of heat sink monitoring, etc., have facilitated high efficiencies for solid-state lasers. These are methods for minimizing loss at the stage of transforming the external source power into power stored as optical excitation of electrons in the solid state matrix.

Another source of efficiency loss comes from the next step: the extraction of laser medium excitation power into the power of the amplified output signal. Efficiency of the laser amplifier stored power extraction is often deteriorated by a non-uniformity of the intensity of the amplified laser beam. In practice, a laser beam intensity pattern is usually non-uniform or fine structured inside the active elements of HEL systems because of the coexistence of two factors: optical aberrations and the spatial coherence of laser radiation. Fine structures of different types, such as coherent beam caustics, speckles, and interference fringes, reduce the bulk filling factor or the overlap of the laser beam with the amplifying medium due to multiple local spots or areas where the laser light does not saturate the medium and does not extract the stored energy. Power stored at those spots/areas does not contribute to signal amplification but is wasted by fluorescence and amplified spontaneous emission (ASE). The total results of such negative effects can exceed 35% in reduction of the maximal possible extraction efficiency.

Prior attempts to increase the extraction efficiency of optical amplifiers were mostly targeted at eliminating the underfill effects caused by non-ideal geometrical overlaps between the laser beam and the laser active medium. These effects correspond to a large spatial scale comparable to the size of the active element. Solutions include: 1) matching the input beam footprint to the input entrance of the amplifier to exclude empty areas near the borders, 2) double-passing or multi-passing the same active volume and through neighboring paths cover the volume with high intensity signal, 3) integrated reflectors for amplifier slabs to arrange complementary paths at zigzagging.

Another effect, known as the hole burning effect, that reduces the amplifier extraction efficiency is due to the interference of counter propagating coherent laser beams and the subsequent creation of an intensity spatial modulation pattern of about a half-wavelength scale. A typical solution to minimize this effect is to operate the amplifier at multiple laser wavelengths or in short pulses without time-overlap inside the amplifier medium. No known attempts have been made to solve the problem of the underfill at the level of intensity occurring in fine structured laser beams due to coherent interference and diffraction propagation effects.

Hence, a need exists in the art for a system or method for reducing underfill effects due to fine structured laser beams to increase extraction efficiency in laser amplifiers.

SUMMARY OF THE INVENTION

The need in the art is addressed by the high extraction efficiency laser system of the present invention. The novel laser system includes a laser amplifier and a laser source adapted to provide a laser beam to the amplifier such that polarization states for incident and reflected light within the amplifier are perpendicular one to another. In an illustrative embodiment, the laser beam is input to the amplifier such that the beam reflects back and forth between the side walls of the amplifier with an angle of incidence of about 45 degrees, and the laser beam is linearly polarized in the plane of incidence. This arrangement reduces interference fringes in the amplifier. In an alternative embodiment, the system includes an aberrator adapted to add time-varying aberrations in the laser beam at a rate exceeding an inversed lifetime of an inverted population in the amplifier to increase spatial homogenization of saturation and extraction patterns in the amplifier.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

One of the attractive approaches for developing a high brightness weapon-class solid-state laser is to use a double-pass master oscillator/power amplifier (MOPA) configuration with a nonlinear phase conjugate mirror (PCM) between passes. A key point of this approach is to get high quality output from high power but low optical quality amplifiers using reciprocity of diffraction for the phase conjugate beam.

Figure 1:
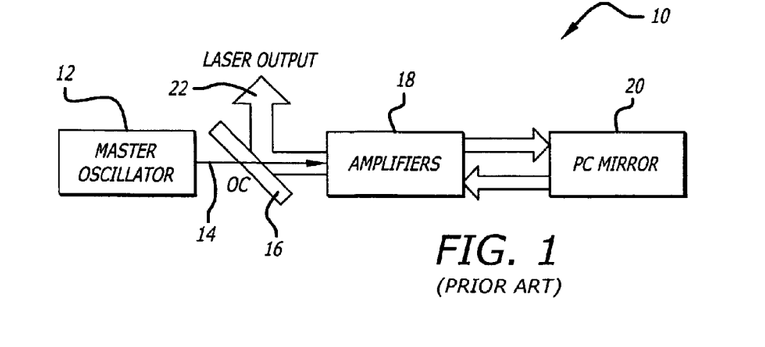
FIG. 1 is a simplified block diagram of a basic phase conjugate MOPA laser system.

FIG. 1 is a simplified block diagram of a basic phase conjugate MOPA laser system 10. The system 10 includes a low power master oscillator 12, which delivers a high quality single-mode reference beam 14 through an optical outcoupler (OC) 16 to a high power amplifier 18 (or amplifiers). The beam is then amplified to moderate power. Thermally induced lens and other optical distortions and stress-induced birefringence result usually in severe aberrations and depolarization—beam quality is lost while power is increased due to amplification. But the beam enters a phase conjugate mirror 20, which reflects the beam back to the amplifier 18 with wavefront inversion, which is called phase conjugation. The phase conjugate beam passes back through the same beamline to extract the power stored in the amplifier 18. Simultaneously, the original high quality wavefront is restored because diffraction is reciprocal for the conjugate beam. A high quality, high power laser beam 22 is then output by the outcoupler 16.

Literature about methods of phase conjugation and about PC MOPA is widely available. See, for example, the following references, the teachings of which are incorporated herein by reference:

1. D. M. Pepper, "Nonlinear Optical Phase Conjugation," Optical Engineering, Vol. 21, No. 2, p. 156, 1982.

2. B. Ya. Zel'dovich, N. F. Pilipetsky, V. V. Shkunov, "Principles of Phase Conjugation", Springer-Verlag, Berlin, 1985.

3. D. A. Rockwell, "A Review of Phase-Conjugate Solid-State Lasers," IEEE Journal of Quantum Electronics, vol. 24, No. 6, June 1988, pp. 1124-1140.

As discussed above, the problem of power efficiency is critical for high power lasers. Several methods are known for minimizing loss in diode-pumped solid-state laser systems at the stage of transforming the external source power into power stored as optical excitation of electrons in the solid state matrix. Another source of efficiency loss comes from the next step: the extraction of laser medium excitation power into the power of the amplified output signal.

Laser medium excitation is released in two forms—radiation and sensible heat. Radiation occurs in a few different ways: 1) as fluorescence (spontaneous emission of excited electrons), 2) as amplified spontaneous emission (ASE), which is part of fluorescence that is amplified in the gain medium, 3) as parasitic oscillation due to parasitic reflections that accidentally form looped paths for lasing if the gain over the path exceeds the loss at the reflections, and, eventually with a positive effect, 4) as added power of the output signal. Proportions to share power between these channels are controlled by a variety of parameters. Few methods are known for increasing efficiency of extraction into the signal of interest by damping competitive processes in favor of the signal amplification.

Saturation of the amplifier by the amplified laser beam diminishes the power stolen by the fluorescence by eliminating the contribution of spontaneous processes compared to stimulated processes. ASE is reduced by minimizing the amount of spontaneous emission that gets high gain. This can be done by narrowing the ASE solid angle (usually via covering the sides of the amplifier slab with a material having a slightly lower refractive index) for the light guided inside the active element. Parasitic oscillations can be suppressed by over-saturating the medium to drop the gain down below the parasitic oscillation threshold, and also by careful eliminating potential reflections that can form closed optical paths inside the active medium. These methods belong today to a common wisdom domain; their descriptions can be found in tutorial books on high power and solid state lasers, such as the following references, the teachings of which are incorporated herein by reference:

4. W. Koechner, M. Bass, "Solid-State Lasers: A Graduate Text (Advanced Texts in Physics)". Springer-Verlag, New York, 2003.

5. W. Koechner, "Solid-State Laser Engineering". Springer-Verlag, New York, 1999.

A geometrical filling factor is another characteristic parameter that affects amplifier efficiency. A laser beam can extract power by stimulated emission process, which is effective if the beam is physically present in the gain medium and has sufficient intensity; the rest of the medium, which is not illuminated by the laser signal at all or poorly illuminated, meaning the laser signal intensity is too low for effective stored power extraction, contributes to fluorescence, ASE and parasitic oscillations, but not to the laser signal. In general, the geometrical filling factor is the portion of the volume occupied by the laser beam relative to the overall volume of excited laser medium available for laser energy extraction; thus, this is the fractional overlap. The lateral fill factor, as part of the geometrical fill factor, is defined as a portion of the amplifying medium cross section that is covered by the footprint of the propagating laser beam. There is also a longitudinal fill factor, similar to the lateral one, which accounts for overlap between the laser beam and the amplifying medium along the longitudinal direction of the laser amplifying medium.

A standard method for fill factor improvement includes matching the input beam footprint to the input face and cross section of the laser medium. Good matching is typically possible only for top-hat beam footprints. For real smooth-edge beams overfilling the input aperture is often recommended—the footprint is taken larger than the size of the input face of the amplifier. This method gives a limited effect, however, even for straight-pass active elements since overfilling means also that the input signal power beyond the input face is clipped and lost. A change of amplified beam size inside the amplifier medium, caused by thermal lensing for instance, may also spoil the volume (lateral and/or longitudinal) overlap and subsequently the extraction.

Good lateral fill is not sufficient to optimize amplifier extraction along the longitudinal direction of beam propagation. For a small signal input, the unsaturated part of the medium near the amplifier entrance contributes to the laser beam amplification, but the signal may not be powerful enough to provide sufficient extraction of stored power. A more homogeneous saturation over the length can be achieved by double-passing or multi-passing the amplifier through the same part of the cross-section, or through parallel channels, usually at orthogonal polarizations. Mutually orthogonal polarizations for forward and backward passes eliminate also gain gratings that appear due to the "spatial hole burning" effect in a narrow-band laser system. Using the amplifier in a regenerative mode by placing it between semi-transparent mirrors is another known method to get more homogeneous saturation. See, for examples, the following references, the teachings of which are incorporated herein by reference:

6. U.S. Pat. No. 4,019,151. K. Brueckner, S. Jorna, N. K. Moncur. Multiple pass laser amplifier system, Apr. 19, 1977.

7. R. Paschotta, J. Nilsson, L. Reekie, A. C. Trooper, D. C. Hanna. Single-frequency ytterbium-doped fiber laser stabilized by spatial hole burning. Optics Letters. 22 (1), 40, 1997

8. W. Lowdermilk, et al., The Multipass Amplifier: Theory And Numerical Analysis, J. Appl. Phys. 51(5), 1980

There is a geometrical fill factor problem specific for one path zigzag propagation through the slab amplifier designed for a shallow bouncing angle, when there are 100% unfilled shadow areas in the bulk between reflections even if the lateral fill is perfect at the entrance of the slab. In a patent application entitled "ZIGZAG SLAB LASER AMPLIFIER WITH INTEGRAL REFLECTIVE SURFACE AND METHOD" by R. Reeder, S. Matthews, and A. Betin, Ser. No. 10/425,578, filed Apr. 29, 2003 (Atty. Docket No. PD 02W195), the teachings of which are incorporated herein by reference, an integral reflector was proposed to split the beam cross-section wise in two beams and combining them into one output beam again after one path zigzagging through the slab with complementary fill of the shadowed areas.

The technical solutions listed above as the known art do not teach how to overcome a bulk underfill associated with a fine structure of intensity pattern. Signal beam intensity inside the laser amplifier medium can be fine structured or modulated in space due to its natural diffraction and due to fringes appearing on the amplified beam caused by interference with deflected/reflected and scattered wave components. Then, power is extracted well at locations of high local signal intensity only, while there is inefficient extraction at intensity minima. There are several particular mechanisms that lead to the formation of a fine structured laser beam intensity pattern.

Figure 2:
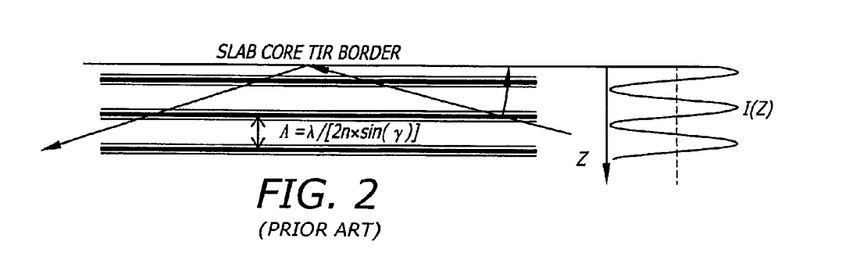
FIG. 2 is an illustration showing an interference fringe pattern in a laser slab.

FIG. 2 is an illustration showing an interference fringe pattern in a laser slab. Interference fringes are formed at zigzag propagation through slab amplifiers by laser beams reflecting off the TIR (total internal reflection) surface of the laser slab. The fringes occur near the TIR surface because the incident and reflected beams are mutually coherent automatically, even in the case of large radiation bandwidth or short coherence length. The fringe contrast is very high (close to 100%) near the reflecting surface because TIR results in equal intensities. The fringes keep high contrast over the entire volume between the walls of the slab if the longitudinal correlation length of light (Rayleigh range of one speckle) due to diffraction exceeds the slab thickness. At the valleys between the fringe maxima no signal light is present.

Other types of fine structured intensity patterns usually appear in the bulk of the active medium. Quasi-random fine structure (or speckled structure) of intensity of an amplified laser beam may appear in any amplifier, but it is especially common in amplifiers within a PC MOPA architecture (since PC MOPA amplifiers are allowed to be low quality amplifiers). The cause for quasi-random fine structure is either distortions of the incident to amplifier laser beam (wavefront, clipping, etc.) or optical non-uniformities (can be thermally induced) in the laser amplifying medium. Then, diffraction and propagation develops fine scale speckle-type intensity spatial fluctuations within the volume of the active medium. These intensity fluctuations are originated from the interference effect also, but the interference occurs now between different rays originally present within the laser beam or rays successively tilted by optical inhomogeneities of the medium. Inhomogeneities are usually random giving quasi-random patterns. Static or slow in time refractive index variations mix the light, but do not deteriorate coherence between rays that pass different paths before crossing (unless the path difference for different rays exceeds coherence length of the generated or amplified light), thus facilitating strong interference effects resulting in deep intensity modulation.

Figure 3A:
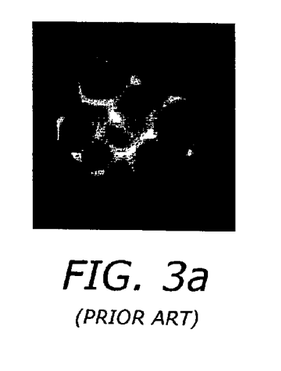
FIG. 3a is an illustration showing a computer simulated caustics type intensity pattern.

Quasi-random fine structure appears as sharp caustics or as random speckles depending on the strength of optical inhomogeneities (in the beam or laser medium) and the length of the amplifier or multiple amplifiers in a beamline. Inhomogeneities of the refractive index or deformed surfaces of a slab tilt the rays differently across the cross section, forcing them to cross a neighboring ray and to form a fine caustic pattern. Caustics are shaped right after the wavefront distorter, within a Fresnel length, where just the neighboring tilted rays can cross. FIG. 3a is an illustration showing a computer simulated caustics type intensity pattern. The simulated pattern shown is formed near the phase aberrator, after a propagation distance of 2 cm. Caustics are characterized by sharp and contrast variations of intensity over the cross section. Light concentrates at relatively narrow lines or spots leaving most of the cross section unattended by laser radiation.

Figure 3B:
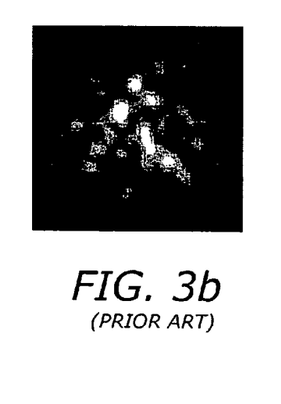
FIG. 3b is an illustration showing a computer simulated speckle type intensity pattern.

At larger propagation distances, where many different tilted rays can cross with each other, caustics lose contrast and a speckle pattern is formed. FIG. 3b is an illustration showing a computer simulated speckle type intensity pattern. The simulated pattern shown is from the same distorted beam of FIG. 3a, but after a longer propagation distance (32 cm) behind the aberrator. Speckles also leave plenty of "empty" spots over the bulk, approximately half of the amplifier volume. But the intensity fluctuations are milder for speckles then caustics. Caustics fill the amplifier's volume poorer even comparing to speckles, because the light is focused as compact stripes that occupy just a minor portion of the cross-section area.

Power is effectively extracted only where the light is present: at bright ridges of TIR-induced fringe, at "hot" stripes of the caustic or "hot" spots of the speckle pattern. Unsaturated fringe valleys, "cool" areas and spots of the pattern are not illuminated by the signal beam leaving no room for stimulated processes. These areas generate fluorescence and amplify ASE and parasitic light instead of working for the signal amplification. This is why the extraction of stored power by means of fine-structure beams is poor compared to a flat intensity pattern. Exactly the same way as it takes place for the large-scale, geometrical under-fill, a proportion between filled and unfilled volumes is what really counts for efficiency of extraction.

The teachings of the present invention increase laser extraction efficiency by reducing the negative effects of incomplete bulk fill by fine-structured beams. Some of the methods described herein are based on placing external aberrating and/or scrambling elements into the beamline. This deteriorates the output beam both for a single pass amplifier or inside a laser cavity. So, the methods with beam deterioration are applicable, first of all, for standard laser sources if the beam quality is not a key priority. However, since the scrambler is optically reciprocal, and since phase conjugation compensates reciprocal aberrations, the quality of the output beam for PC MOPA architectures is fixed and referenced to the good quality beam from the master oscillator, and, hence, it does not suffer.

Figure 4:
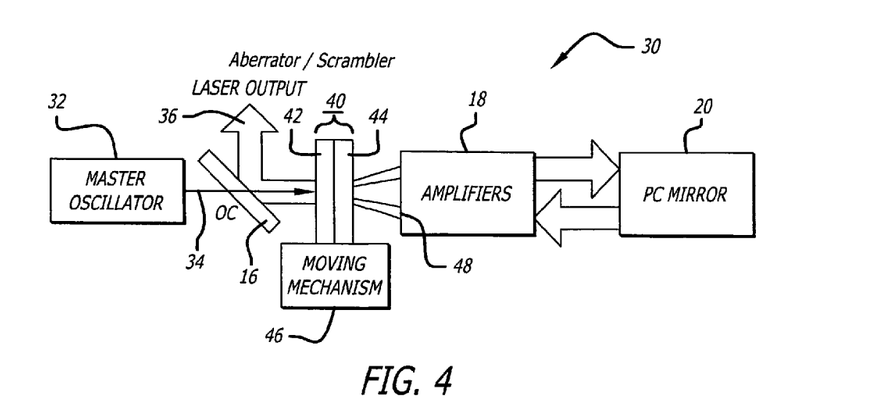
FIG. 4 is a simplified block diagram of an illustrative embodiment of a laser system designed in accordance with the teachings of the present invention.

FIG. 4 is a simplified block diagram of an illustrative embodiment of a laser system 30 designed in accordance with the teachings of the present invention. The system 30 shown is a PC MOPA configuration; however, the invention is not limited thereto. The present teachings may be applied to other laser architectures without departing from the scope thereof.

The system 30 includes a master oscillator 32, which delivers a high quality laser beam 34 through an optical outcoupler 16 to a high power amplifier 18 (or a multiple amplifier chain). The beam is amplified to moderate power and then passed to a phase conjugate mirror 20, which reflects the beam back to the amplifier 18. The phase conjugate beam passes back through the same beamline to extract the power stored in the amplifier 18, and a high quality, high power laser beam 36 is then output by the outcoupler 16.

In accordance with the teachings of the present invention, the laser system 30 also includes a wavefront aberrator 42 disposed between the master oscillator 32 and the amplifier 18 (preferably between the outcoupler 16 and the amplifier 18) to eliminate the formation of caustic intensity patterns within the amplifier 18.

The worst fine structure intensity pattern for extraction is the caustic pattern. Caustics form the least bulk fill among the different fine structures of diffracting light patterns, see FIG. 3a. The caustics appear at a limited distance, in a so-called Fresnel zone right behind the phase aberrator in the amplifier. It is known that a length of the Fresnel zone becomes shorter as a quadratic function if the angular divergence of the aberrated beam increases. After propagating the Fresnel distance, a contrast of spatial fluctuations of the intensity pattern drops down, and the caustic pattern is transformed into a speckle pattern, like the one shown in FIG. 3b. The contrast for the caustics pattern formed by a distorted active element is controlled by the angular divergence of the incident beam, before it is distorted by the medium. The smaller the input divergence, the sharper the pattern formed, and, hence, the lower the diffraction efficiency within the Fresnel zone. If the incident beam is fine-structured having an angular divergence larger than the divergence induced by the medium itself; caustics are not formed at all.

The wavefront aberrator 42 is designed to increase power extraction efficiency by means of eliminating caustics. The aberrator 42 should be strong enough to create a speckle structure with a characteristic angular divergence that exceeds the divergence that is induced by optical inhomogeneities in the active medium. In addition, the aberrator 42 and/or its image plane should be positioned at a distance from the amplifier input window 48. This distance should exceed the Fresnel length for light distorted by the aberrator 42. If these two conditions are met, the pre-aberrated beam enters the amplifier 18 and propagates through it having developed a speckle pattern and no high contrast caustics. Optical inhomogeneities inside the amplifier 18 are, in such case, weak to focus light into caustics further in the optical train. Multiple passes of propagation through the amplifier medium (by multiplexing the angle of incidence) can improve the extraction by better averaging the total laser intensity distribution.

Pre-aberrating the input beam eliminates caustics patterns and replaces it with the lower contrast speckle pattern. However, intensity fluctuations for the speckle pattern are still high and power is still unextracted from volumes located between hot speckle spots. Speckles have Gaussian statistics that specify the contrast of intensity fluctuations as unity: $\langle (I-\langle I \rangle)^2 \rangle^{1/2} = \langle I \rangle$. Extraction efficiency can be evaluated, for any cross section of the amplifier, by the spatial average of the extraction rate $\eta = I \cdot g(I)$. This rate is a product of local intensity $I(x,y)$ and local gain factor $g(I)$, which also depends on the intensity and coordinates $(x,y)$ due to medium saturation.

Calculations show that up to 20% of extraction can still be lost due to fluctuations of the intensity speckle pattern. This loss is due to the abundance of space between the "hot" speckle spots, see FIG. 3b, which is not filled by the amplified light. The unfilled regions for speckle patterns refer to the presence of randomly located points of the so-called wavefront dislocations, where the light intensity becomes exactly zero. Zero points are inherent for speckle patterns, and the concentration of "cold" zero points equals the concentration of "hot" spots for any speckle pattern with Gaussian statistics.

Figure 5A:
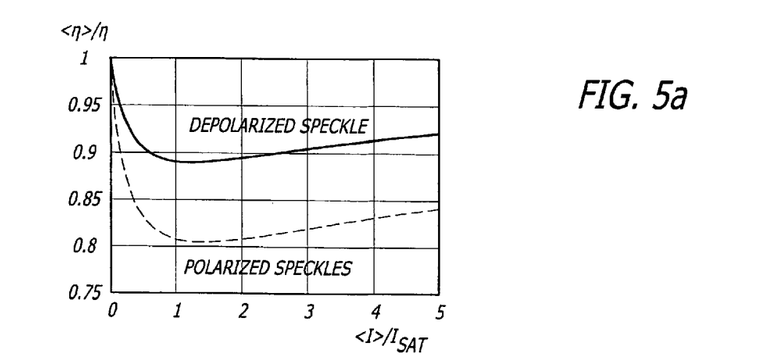
FIG. 5a is a graph of the calculated average extraction efficiency for polarized and depolarized speckled beams as a function of a saturation parameter $<I>/I_{sat}$.

FIG. 5a is a graph of the calculated average extraction efficiency for polarized and depolarized speckled beams as a function of a saturation parameter $\langle I \rangle / I_{sat}$. Efficiency is normalized at an extraction efficiency $\eta_0 = I_0 \cdot g(I_0)$ for the same amplifier illuminated by a uniform, top-hat beam with the intensity $I_0 = \langle I \rangle$ equal to the average intensity $\langle I \rangle$ of the speckle beam; $I_{sat}$ is a saturation power of the amplifying medium. As shown in FIG. 5a, a depolarized speckled beam generates a greater extraction efficiency than a polarized speckled beam.

In accordance with the teachings of the present invention, the laser system 30 also includes a polarization scrambler 44 disposed between the master oscillator 32 and the amplifier 18 (preferably between the outcoupler 16 and the amplifier 18) to depolarize the laser beam input to the amplifier 18. A separate scrambler 44 can be used in addition to the wavefront aberrator 42 sitting next to each other. Another option is to install an element 40 that implements both wavefront aberrations and polarization scrambling at the same time in one element.

The scrambler makes the speckle field spatially depolarized, which actually means that the speckle field is a spatial overlap of two independent and uncorrelated speckle patterns present at two orthogonal, vertical and horizontal, polarizations: $E(r,z) = E_v(r,z) \cdot v + E_h(r,z) \cdot h$. FIG. 5a shows the results of calculations for the normalized extraction efficiency if the speckle pattern is completely depolarized, $\langle E_v(r,z) \cdot E^*_h(r,z) \rangle = 0$—zero spatial correlation between the two optical fields. Calculations show that depolarization allows one to take back about half of the lost extraction (compared to polarized input) reducing the maximal loss to about 10%.

The depolarized speckle pattern is an overlap of two different patterns, $I(r,z) = |E_v(r,z)|^2 + |E_h(r,z)|^2$, of vertical and horizontal polarization components that do not interfere with each other. Since the patterns are mutually uncorrelated, $\langle E_v(r,z) \cdot E^*_h(r,z) \rangle = 0$, zero points for one of them are filled by intensity spots of another pattern. While a probability to find a zero near a speckle spot for polarized light is almost 100%, it diminishes for depolarized speckle. In average, the contrast of fluctuations for a depolarized pattern $I(r,z)$ becomes twice smaller, $\langle (I-\langle I \rangle)^2 \rangle^{1/2} = \langle I \rangle / 2$.

Figure 5B:
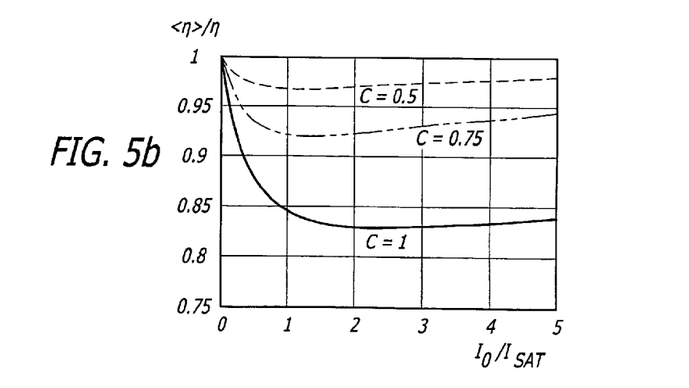
FIG. 5b is a graph of the calculated average extraction efficiency $\eta = I \cdot g(I)$ for a top-hat beam pattern covered by interference fringes, $I = I(z) = I_0\{1 + C \cdot \cos(2\pi z/\Lambda)\}$, of differing fringe contrasts C.

In addition to the speckle fluctuations in the pattern intensity, which are randomly distributed in space, the regular fringe patterns that appear due to the interference of the amplified beam with the reflected from the slab wall replica of itself, as illustrated in FIG. 2, deteriorates the extraction efficiency. FIG. 5b is a graph of the calculated average extraction efficiency $\eta = I \cdot g(I)$ for a top-hat beam pattern covered by interference fringes, $I = I(z) = I_0\{1 + C \cdot \cos(2\pi z/\Lambda)\}$, of differing fringe contrasts C. Extraction is plotted against normalized signal intensity $I_0 / I_{sat}$ demonstrating that up to 17% of extraction can be lost at 100% fringe contrast compared to a flat intensity beam with the same average intensity $I_0$ but no fringe. Lower fringe contrasts improve the situation significantly, making extraction loss almost negligible at a fringe contrast ratio, C=0.5.

A fine-structured aberrator 42 helps to eliminate caustics, but not the contrast fringes at TIR reflections. The fringes are separated by the constant spacing, $\Lambda \approx \lambda / [2n \cdot \sin(\gamma)]$ and they are parallel to the slab wall. The first fringe is located, also, at a fixed distance from the wall. Its location is specified by the zigzagging angle, $\gamma$; more exactly, by a phase shift at TIR reflection, which is also defined sharply by the angle $\gamma$. The aberrator 42 makes the fringes wave together with randomized speckles deep inside the slab. But it does not affect fringe contrast for polarized light, leaving extraction poor.

The polarization scrambler 44 decreases the contrast of random speckle fluctuations by a factor of two. For the same reason, due to the decorrelation of the random phase pattern for fields $E_v(r,z)$ and $E_h(r,z)$ at orthogonal polarizations, TIR fringe patterns also decorrelate. Decorrelated fringes overlap resulting in low contrast—bright fringes for one polarization cover, with about 50% probability, fringe minima for the other.

However, fringes for the patterns at different polarizations—vertical $|E^v(r,z)|^2$ one and horizontal $|E_h(r,z)|^2$ one—decorrelate only in the depth of the slab. In the vicinity of the reflecting surfaces, where fringes are parallel to the surface, the fringes coincide. The reason is that at angles of practical interest, $\gamma<0.4$ rad, the TIR phase shifts are almost the same for s- and for p-polarization components resulting in matching locations of the first fringe. The fringes stay parallel to the wall at some depth $\Delta z$ from the reflecting wall, fitting one another to maintain high contrast. Patterns of incident and reflected speckles coincide automatically right at the TIR surface. But they lose mutual correlation at a depth $\Delta z \approx \Delta r_{cor}$, where $\Delta r_{cor} \approx \lambda \cdot [n\,\Delta\theta_{sp}]^{-1}$ is a transverse correlation size of the speckles, which is controlled by the wavelength $\lambda$, refractive index "n" and speckle divergence $\Delta\theta_{sp}$ in the medium. Thus, the polarization scrambler 44 compensates, in part, the fringe-induced extraction loss in a bulk of the slab. A part of the slab volume, where fringe contrast is reduced by depolarization and subsequently extraction is good, amounts to 1–2 $(\lambda/h)/\Delta\theta_{sp}$; this covers almost the entire volume if the divergence $\Delta\theta_{sp}$ exceeds much the diffraction limited divergence angle $\lambda/h$ defined by the slab thickness h, i.e. if $2(\lambda/nh)/\Delta\theta_{sp}\ll 1$.

In accordance with the teachings of the present invention, the coherence length $L_{coh}$ of the amplified signal is shortened to eliminate extraction loss due to TIR fringes in the slab amplifiers. The fringes disappear in the middle portion of the slab if the coherence length $L_{coh}$ of the amplified signal is made shorter than $\Delta L_{max}=h\cdot\{1-\cos(\gamma)\}/2\sin(\gamma)$. The length $\Delta L_{max}$ represents the maximal path difference between the rays interfering inside the slab at zigzagging. The path difference diminishes at the walls but reaches its maximum exactly at the middle, at $z=h/2$. Shortening the coherence length below the limit $L_{coh}<\Delta L_{max}$ can be done by standard methods of broadening the generation spectrum of the master oscillator 32. It can also be done by removing narrowband selecting elements from the cavity, and replacing them, if needed, by broadband selectors, and also by tuning the cavity after that. Note, that amplification of short pulses can accomplish the same improvement in extraction efficiency; in this case, the pulse duration should be less than the time required for light to propagate the distance $\Delta L_{max}$.

Figure 6:
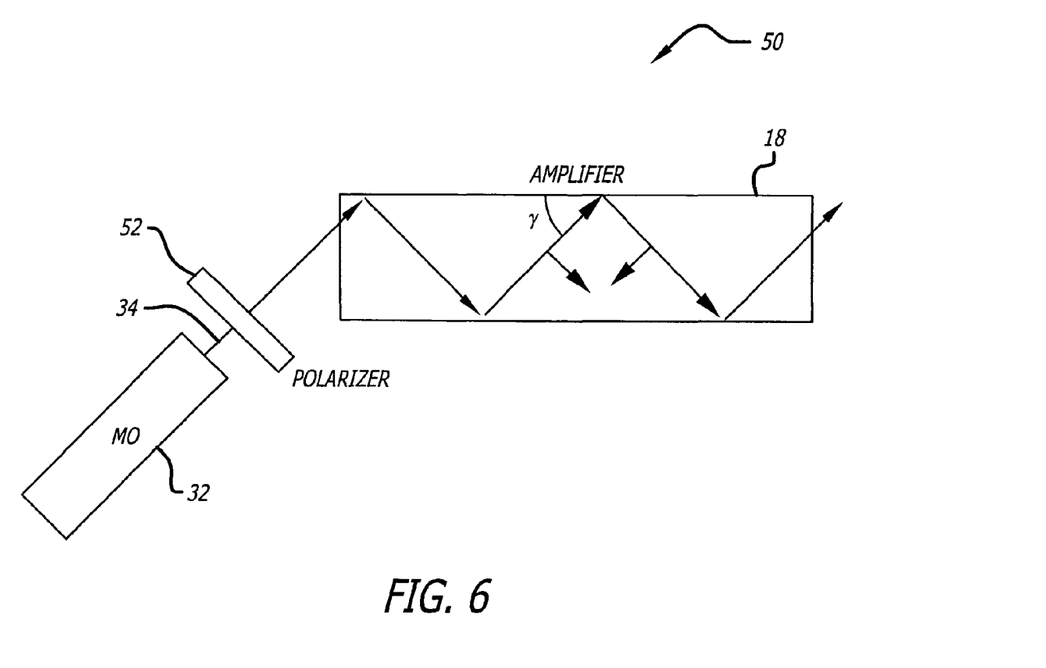
FIG. 6 is a simplified block diagram of an illustrative laser system using an alternate method for reducing TIR fringes in accordance with the teachings of the present invention.

FIG. 6 is a simplified block diagram of an illustrative laser system 50 using an alternate method for reducing TIR fringes in accordance with the teachings of the present invention. In this embodiment, the source laser beam 34 from the master oscillator 32 is zigzagged through the slab 18 close to a specific angle, $\gamma\approx 45°$, with p-polarized light (i.e. with light linearly polarized in the plane of incidence). If necessary, a polarizer 52 may be used between the MO 32 and the amplifier 18 to p-polarize the beam 34. With this geometry, the linear polarization states for incident and reflected light are perpendicular one to another resulting in diminished fringe contrast.

Returning to FIG. 4, in accordance with the teachings of the present invention, the laser system 30 also includes a mechanism 46 for rotating or otherwise moving the aberrator 42 and/or polarization scrambler 44. The extraction efficiency of the laser system 30 can be increased by varying in time the pattern of the aberrations inside the amplifiers 18. The rate of the time variations $\nu$ should exceed the inversed lifetime, $\nu>1/\tau$, of the inverted population in the medium; the inversion lifetime $\tau$ is usually given by an upper level lifetime $\tau=\tau_0$ for an unsaturated amplifier. On the other hand, in application to a PC MOPA architecture as shown in FIG. 4, the rate $\nu$ should be slower than an inversed response time, $\nu<1/\tau_{PC}i$, of the PC mirror 20 used in the PC MOPA system; the mirror response time is usually defined by a decay time of dynamic holographic gratings $\tau_{PC}=\tau_{gr}$.

If the intensity pattern varies faster than the inversion population lifetime scale, $\tau$, the saturated pattern of the upper level population turns out to be too sluggish to follow the fluctuations of the intensity pattern in real time. As a result, spatial "holes" of the population density, which are "burned out" by the pattern of the signal intensity, are washed out flattening out the population density. Flat population density means flat gain profile $g(r,z)\approx g(<I>)$, and the average extraction rate approaches the rate that one gets for a uniform, top-hat beam of the same average intensity $<\eta>=<I\cdot g(I)>\approx <I>g(<I>)$. The PC mirror performance does not suffer, it operates properly by adiabatically following incident pattern variations and providing sufficient reflectivity and conjugation fidelity since the operation bandwidth $1/\tau_{gr}$ for the PC mirror covers the full spectrum of the variations.

In summary, extraction efficiency for fine structured beams is poor because of the abundance of optically pumped but unsaturated local spots in the amplifier. The present teachings reduce unsaturated volume by homogenizing the spatial pattern of inverted population. First, the intensity pattern of the fine structured beam itself is homogenized by dispersing it with a fine-scale aberrator to eliminate caustics. Second, the fine structured beam is depolarized to reduce the contrast of speckles. Third, interference fringes at zigzagging through the slab are eliminated or reduced by shortening the coherence length of the amplified signal and/or by using p-polarization and an incident angle of $\gamma\approx 45°$. Finally, increased spatial homogenization of saturation and extraction patterns is achieved through time averaging by time-varying and time-moving the fine scale pattern of the amplified beam within the amplifier active volume. These methods can be used separately, or in various combinations to increase power extraction efficiency in laser systems.

Thus, the present invention has been described herein with reference to a particular embodiment for a particular application. Those having ordinary skill in the art and access to the present teachings will recognize additional modifications, applications and embodiments within the scope thereof. For example, the illustrative embodiments have been described with reference to a solid-state PC MOPA configuration. Other laser technologies and architectures, however, may be used without departing from the scope of the present teachings.

It is therefore intended by the appended claims to cover any and all such applications, modifications and embodiments within the scope of the present invention.

Accordingly,

What is claimed is:

1. A laser system, comprising:
   a slab laser amplifier arranged to receive a source laser beam; and
   a polarizer arranged between said source laser beam and said slab laser amplifier such that a linearly polarized laser beam enters at a non-perpendicular angle to an end portion of said slab laser amplifier and zigzags therethrough such that polarization states for incident and reflected light within said slab laser amplifier are perpendicular one to another to thereby reduce interference fringes in the slab laser amplifier.

2. The system of claim 1, wherein said laser beam is provided to said slab amplifier such that said linearly polarized laser beam zigzags back and forth between side walls of said slab amplifier at an angle of incidence of about 45 degrees.

3. The system of claim 2, wherein said polarizer linearly polarizes said laser beam in a plane of incidence of said beam with said side walls.

4. A laser system comprising:
   a master oscillator that provides a laser beam;
   a slab laser amplifier positioned to receive said laser beam at a non-perpendicular angle to an end portion thereof such that said beam reflects back and forth between side walls of said slab amplifier with an angle of incidence of about 45 degrees; and
   a polarizer adapted to linearly polarize said laser beam in a plane of incidence formed by said beam and said side walls of said slab laser amplifier,
   wherein linearly polarized reflected beams between said side walls interact to reduce interference fringes in the slab laser amplifier and thereby improve power extraction from the slab laser amplifier.

5. A method for reducing interference fringes and thereby improve power extraction in a slab laser amplifier, the method comprising:
   inputting a laser beam to said slab laser amplifier at a non-perpendicular angle to an end portion thereof such that said beam reflects back and forth between side walls of said slab laser amplifier with an angle of incidence of about 45 degrees; and
   linearly polarizing said laser beam in a plane of incidence formed by said beam and said side walls of said slab laser amplifier,
   wherein linearly polarized beams reflected between said side walls of said slab laser amplifier interact to reduce interference fringes in the slab laser amplifier and thereby allow the improved power extraction from the slab laser amplifier.

* * * * *